(12) United States Patent
Shin

(10) Patent No.: US 12,409,725 B2
(45) Date of Patent: *Sep. 9, 2025

(54) POWER TRANSMISSION DEVICE AND AUTOMOBILE INCLUDING THE SAME

(71) Applicant: HYUNDAI MOBIS CO., LTD., Seoul (KR)

(72) Inventor: Kyeong Ho Shin, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 375 days.

This patent is subject to a terminal disclaimer.

(21) Appl. No.: 17/990,987

(22) Filed: Nov. 21, 2022

(65) Prior Publication Data

US 2023/0182566 A1    Jun. 15, 2023

(30) Foreign Application Priority Data

Dec. 14, 2021 (KR) .......................... 10-2021-0178504

(51) Int. Cl.
*B60K 17/04* (2006.01)
*B60K 7/00* (2006.01)
*F16H 3/00* (2006.01)

(52) U.S. Cl.
CPC .......... *B60K 17/046* (2013.01); *B60K 7/0007* (2013.01); *F16H 3/005* (2013.01); *B60K 2007/0092* (2013.01)

(58) Field of Classification Search
CPC .... B60K 17/043; B60K 17/046; B60K 17/08; B60K 7/0007; B60K 2007/0092; F16H 3/005; F16H 1/32; F16H 57/02; B60B 35/125

See application file for complete search history.

(56) References Cited

U.S. PATENT DOCUMENTS

| | | | |
|---|---|---|---|
| 10,759,268 B2 * | 9/2020 | Mehlis | F16H 3/54 |
| 11,511,623 B2 * | 11/2022 | Shin | B60K 17/26 |
| 2012/0100948 A1 * | 4/2012 | Lin | F16H 3/60 |
| | | | 475/287 |
| 2017/0137085 A1 * | 5/2017 | Yamamoto | F16H 3/666 |
| 2018/0010668 A1 * | 1/2018 | Hirano | F16H 57/082 |
| 2019/0176609 A1 * | 6/2019 | Bando | B60K 6/365 |

* cited by examiner

*Primary Examiner* — Lori Wu
(74) *Attorney, Agent, or Firm* — NSIP Law

(57) ABSTRACT

Disclosed is a power transmission device including a motor including a rotary shaft, a speed reducer provided on one side of the motor, and a power transmitter, provided inside the speed reducer, that transmits rotational force generated by driving of the motor to the speed reducer. The power transmitter transmits the power such that a ratio of rotational angular velocity of the speed reducer to rotational angular velocity of the rotary shaft is changed according to rotation directions of the rotary shaft of the motor.

13 Claims, 3 Drawing Sheets

POWER TRANSMISSION DEVICE AND AUTOMOBILE INCLUDING THE SAME

CROSS-REFERENCE TO RELATED APPLICATION

This application claims the benefit under 35 USC § 119(a) of Korean Patent Application No. 10-2021-0178504, filed on Dec. 14, 2021, in the Korean Intellectual Property Office, the entire disclosure of which is incorporated herein by reference for all purposes.

BACKGROUND

1. Field

The present disclosure relates to a power transmission device and an automobile including the power transmission device.

2. Description of Related Art

Motors for converting electric energy into kinetic energy may be mounted to devices in various fields. Such a motor may be mounted to, for example, an automobile and produce a driving force of the automobile. As demands for eco-friendly automobiles for solving environmental pollution caused by existing internal-combustion engines increase, demands for motors mounted to the automobiles also increase.

Meanwhile, to drive the automobile using the motor, it is desirable to reduce the rotation speed of a rotary shaft provided in the motor and transmit the speed to a wheel. Accordingly, separate speed reducers are commonly provided between the motor and the wheel.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a power transmission device including a motor including a rotary shaft, a speed reducer provided on one side of the motor, and a power transmitter, provided inside the speed reducer, that transmits rotational force generated by driving of the motor to the speed reducer. The power transmitter transmits the power such that a ratio of rotational angular velocity of the speed reducer to rotational angular velocity of the rotary shaft is changed according to rotation directions of the rotary shaft of the motor.

The speed reducer may include a sun gear provided on the outside of the rotary shaft of the motor in a radial direction (R), multiple planetary gears provided on the outside of the sun gear in the radial direction (R) configured to engage with the sun gear, and a carrier which is coupled to the plurality of planetary gears and configured to rotate in engagement with revolution of the plurality of planetary gears around the sun gear. The power transmitter may further include a first one-way clutch provided between the rotary shaft of the motor and the sun gear, and a second one-way clutch provided between the rotary shaft of the motor and the carrier.

The first one-way clutch and the second one-way clutch may have phases opposite to each other.

When the rotary shaft of the motor rotates in a first direction (D1), the first one-way clutch may transmit power to the sun gear. The power may be generated by rotation of the rotary shaft of the motor.

When the rotary shaft of the motor rotates in the first direction (D1), the second one-way clutch may interrupt the power transmission between the motor and the carrier.

When the rotary shaft of the motor rotates in a second direction (D2) opposite to the first direction (D1), the second one-way clutch may transmit power to the carrier. The power is generated by rotation of the rotary shaft of the motor.

The first one-way clutch and the second one-way clutch may be spaced apart from each other in an axial direction (A) in which the rotary shaft extends.

An outer diameter of the first one-way clutch may be equal to an outer diameter of the second one-way clutch.

The speed reducer may further include a ring gear provided on the outside of the multiple planetary gears in the radial direction (R) to engage with the multiple planetary gears.

The power transmission device may further include a speed reducer housing configured to accommodate the speed reducer. The power transmitter may further include a third one-way clutch provided between the carrier and the speed reducer housing.

The third one-way clutch may have the same phase as the first one-way clutch.

In another general aspect, here is provided an automobile including: a power transmission device, and a wheel that receives rotational force from the power transmission device. The power transmission device includes a motor including a rotary shaft; a speed reducer provided on one side of the motor, and a power transmitter, provided inside the speed reducer, that is configured to transmit rotational force generated by driving of the motor to the speed reducer. The power transmitter transmits the power such that a ratio of rotational angular velocity of the speed reducer to rotational angular velocity of the rotary shaft is changed according to rotation directions of the rotary shaft of the motor.

The speed reducer may include a sun gear provided on the outside of the rotary shaft of the motor in a radial direction (R), multiple planetary gears provided on the outside of the sun gear in the radial direction (R) to engage with the sun gear, a carrier which is coupled to the multiple planetary gears and configured to rotate in engagement with revolution of the multiple planetary gears around the sun gear, and a ring gear provided on the outside of the multiple planetary gears in the radial direction (R) to engage with the multiple planetary gears.

The automobile may further include a wheel bearing coupled to the outside of the ring gear in the radial direction (R). The wheel bearing may include an inner race fixed to the ring gear, and an outer race provided on the outside of the inner race in the radial direction (R).

Other features and aspects will be apparent from the following detailed description, the drawings, and the claims.

Figure 1:
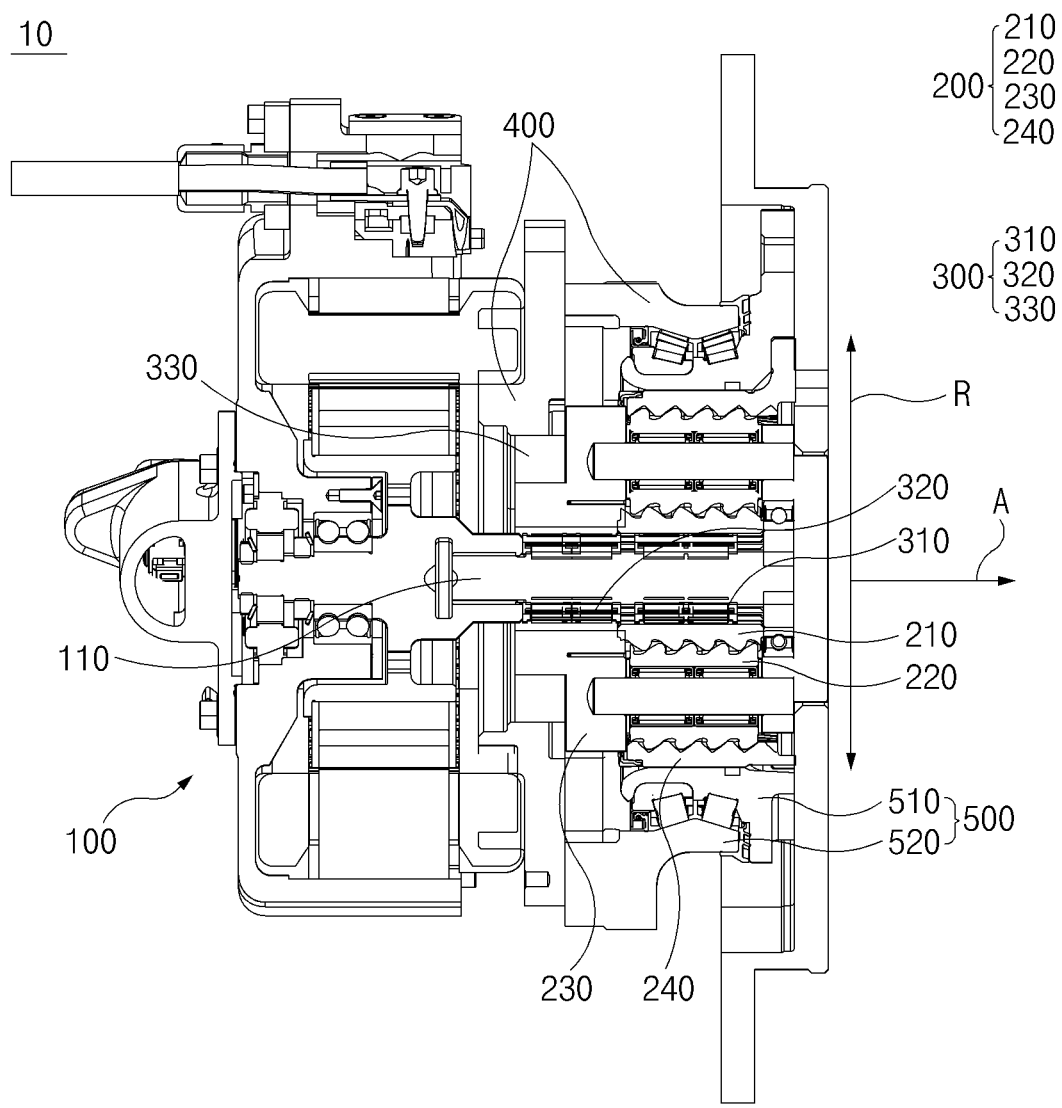
FIG. 1 is a view illustrating a power transmission device according to the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
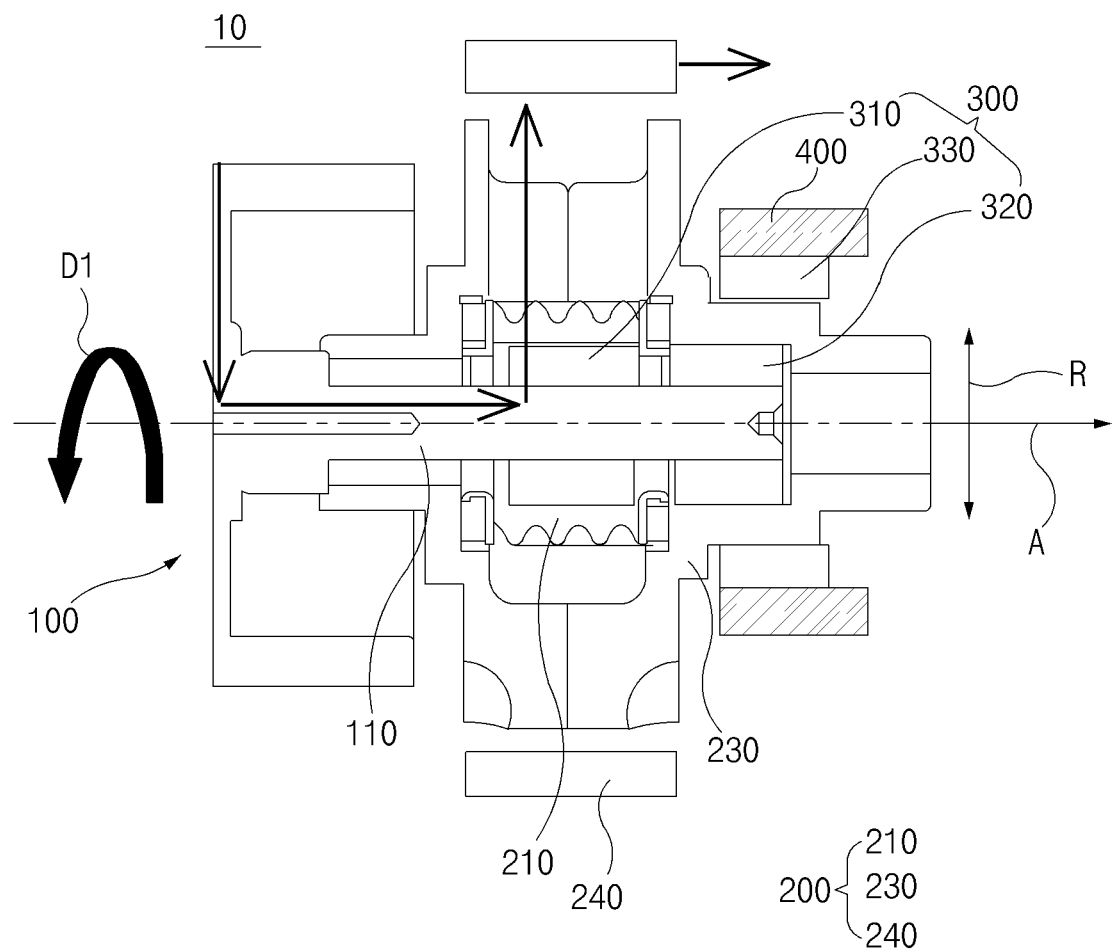
FIG. 2 is a view showing a power transmission path when a rotary shaft provided in a motor of a power transmission device according to the present disclosure rotates in a first direction.
Figure 3:
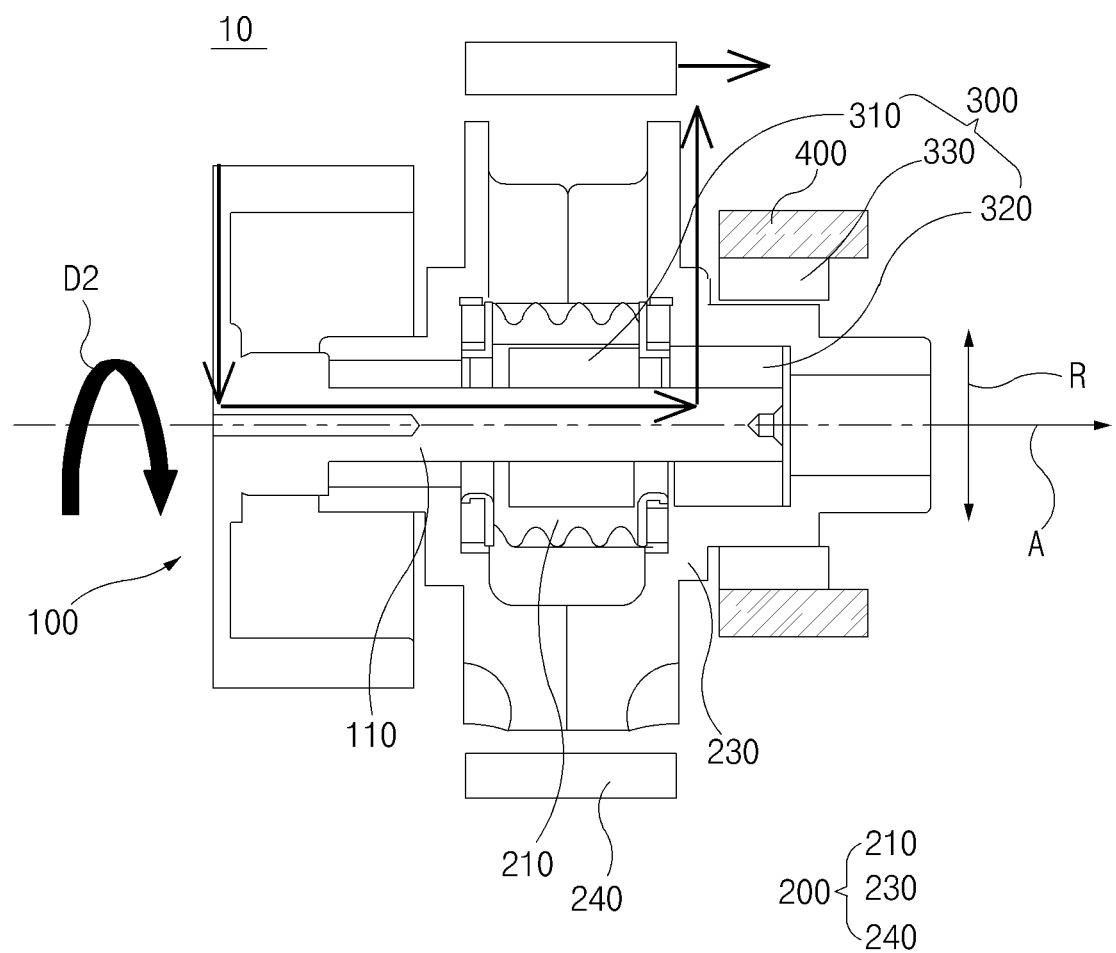
FIG. 3 is a view showing a power transmission path when the rotary shaft provided in the motor of the power transmission device according to the present disclosure rotates in a second direction.

FIG. 1 is a view illustrating a power transmission device according to the present disclosure. FIG. 2 is a view showing a power transmission path when a rotary shaft provided in a motor of a power transmission device according to the present disclosure rotates in a first direction, and FIG. 3 is a view showing a power transmission path when the rotary shaft provided in the motor of the power transmission device according to the present disclosure rotates in a second direction.

Referring to FIG. 1, a power transmission device 10 for an automobile (hereinafter, referred to as a 'power transmission device') according to the present disclosure may include a motor 100 including a rotary shaft 110.

A speed reducer 200 may be provided on one side of the motor 100. The speed reducer 200 transmits power of the motor 100 to an external component, for example, a wheel, and may be configured to reduce rotational angular velocity of the rotary shaft 110 of the motor 100 and increase torque and then transmit the rotation to the external component. Thus, according to the present disclosure, the external component such as the wheel may be configured to rotate by receiving the power of the motor 100 from the speed reducer 200. Moreover, the speed reducer 200 may provide two or more power transmission paths when transmitting the power of the motor 100 to the external component.

According to the present disclosure, the speed reducer 200 may be a planetary gear speed reducer. That is, as illustrated in FIG. 1, the speed reducer 200 may include a sun gear 210 coupled to the rotary shaft 110 of the motor 100, a plurality of planetary gears 220 provided on the outer surface of the sun gear 210 to engage with the sun gear 210, a carrier 230 which is coupled to the plurality of planetary gears 220 and rotates in engagement with revolution of the plurality of planetary gears 220 around the sun gear 210, and a ring gear 240 provided on the outside of the plurality of planetary gears 220 in a radial direction R to engage with the planetary gears 220. For example, the carrier 230 accommodates the plurality of planetary gears 220 therein, and the surface of the carrier 230 may have through-holes through which planetary gears 220 are respectively exposed to the outside. Here, in regions where the through-holes are formed, each of the plurality of planetary gears 220 may engage with the ring gear 240.

Continuing to refer to FIG. 1, the power transmission device 10 may further include a power transmission unit 300 (for example, a power transmitter) that transmits, to the speed reducer 200, rotational force of the rotary shaft 110 generated by driving of the motor 100. The power transmission unit 300 may be provided inside the speed reducer 200.

According to the present disclosure, the power transmission unit 300 may be configured to transmit the power such that a ratio of rotational angular velocity of the speed reducer 200 to rotational angular velocity of the rotary shaft 110 (hereinafter, referred to as a speed reduction ratio) is changed according to rotation directions of the rotary shaft 110 of the motor 100. Thus, according to the present disclosure, two or more types of speed reduction ratios may be provided by changing the rotation direction of the rotary shaft 110 of the motor 100 in response to the traveling performance required in an automobile provided with the power transmission device 10. Hereinafter, the power transmission unit 300 will be described.

The power transmission unit 300 may include a first one-way clutch 310, which is provided between the rotary shaft 110 of the motor 100 and the sun gear 210 and has one side coupled to the rotary shaft 110 and the other side coupled to the sun gear 210, and a second one-way clutch 320, which is provided between the rotary shaft 110 of the motor 100 and the carrier 230 and has one side coupled to the rotary shaft 110 and the other side coupled to the carrier 230. More specifically, according to the present disclosure, the rotary shaft 110 of the motor 100 and the sun gear 210 may be spaced apart from each other in the radial direction R with the first one-way clutch 310 therebetween, and the rotary shaft 110 of the motor 100 and the carrier 230 may be spaced apart from each other in the radial direction R with the second one-way clutch 320 therebetween. Meanwhile, the radial direction R may represent a direction perpendicular to an axial direction A in which the rotary shaft 110 of the motor 100 extends.

The one-way clutch is configured to make the power transmission performed in only one direction. That is, the one-way clutch mediates power transmission between one component and another component, and may be configured to transmit power from one component to another component while interrupting power transmission from another component to the one component. Various one-way clutches may be used as the one-way clutch according to the present disclosure. In one example, each of the first one-way clutch 310 and the second one-way clutch 320 may include a sprag clutch. However, types of the one-way clutches are not limited to those described above.

Meanwhile, according to the present disclosure, the first one-way clutch 310 and the second one-way clutch 320 may have phases opposite to each other. Thus, according to the present disclosure, when the rotary shaft 110 of the motor 100 rotates in one direction, the power of the motor 100 may be transmitted to the speed reducer 200 via the first one-way clutch 310, but power transmission via the second one-way clutch 320 may be interrupted. On the contrary, when the rotary shaft 110 of the motor 100 rotates in the opposite direction, the power of the motor 100 may be transmitted to the speed reducer 200 via the second one-way clutch 320, but power transmission via the first one-way clutch 310 may be interrupted. Hereinafter, a power transmission method of a power transmission device according to the present disclosure will be described with reference to FIGS. 2 and 3.

As illustrated in FIG. 2, when the rotary shaft 110 of the motor 100 rotates in a first direction D1, the first one-way clutch 310 may transmit, to the sun gear 210, the power generated by rotation of the rotary shaft 110 of the motor 100, but the second one-way clutch 320 may interrupt power transmission between the motor 100 and the carrier 230. This may be understood as that the first one-way clutch 310 is in a locked state so as to transmit rotational force of the rotary shaft 110 to the sun gear 210 while the second one-way clutch 320 is in an idle state.

More specifically, referring to FIG. 2, when the rotary shaft 110 of the motor 100 rotates in the first direction D1, the rotational force of the rotary shaft 110 of the motor 100 is transmitted to the sun gear 210 via the first one-way clutch 310, and accordingly, the sun gear 210 rotates. Here, when the sun gear 210 rotates, the planetary gears 220 (see FIG. 1) engaging with the sun gear 210 do not revolve around the sun gear 210 but rotate only. Thus, the carrier 230 maintains a fixed state, and the ring gear 240 engaging with the planetary gears 220 rotates. Finally, the rotational force of the rotary shaft 110 is output to the outside via the ring gear 240, and the power is transmitted to the outside in a state the rotation speed is reduced at a certain speed reduction ratio and the torque is increased.

On the other hand, referring to FIG. 3, when the rotary shaft 110 of the motor 100 rotates in a second direction D2 opposite to the first direction D1, the second one-way clutch 320 may be configured to transmit, to the carrier 230, the power generated by rotation of the rotary shaft 110 of the motor 100. This may be understood as that the second one-way clutch 320 is in a locked state so as to transmit rotational force of the rotary shaft 110 to the carrier 230.

More specifically, when the rotary shaft 110 of the motor 100 rotates in the second direction D2, the rotational force of the rotary shaft 110 of the motor 100 is transmitted to the carrier 230 via the second one-way clutch 320, and accordingly, the carrier 230 rotates. Here, the planetary gears 220 (see FIG. 1) coupled to the carrier 230 revolve and rotate in engagement with the rotation of the carrier 230, and make the sun gear 210 and the ring gear 240 rotate. Thus, when the rotary shaft 110 of the motor 100 rotates in the second direction D2, the sun gear 210, the carrier 230, and the ring gear 240 rotate in an integrated state as a single component. Here, the rotational force of the carrier 230 is received from the rotary shaft 110 via the second one-way clutch 320, and thus, the rotational angular velocity of the rotary shaft 110 becomes equal to the rotational angular velocity of the carrier 230. The speed reduction ratio has a one-to-one correspondence unlike when the rotary shaft 110 rotates in the first direction D1. Meanwhile, when the rotary shaft 110 of the motor 100 rotates in the second direction D2, the first one-way clutch 310 having the opposite phase as the second one-way clutch 320 does not directly receive the rotational force of the rotary shaft 110. However, the sun gear 210 is also rotated in the second direction D2 by the rotation of the carrier 230 as described above, and thus, the first one-way clutch 310 rotates together with the sun gear 210 in a locked state.

Meanwhile, the rotation direction of the ring gear 240 is the same when the rotary shaft 110 rotates in the first direction D1 or in the second direction D2, and thus, smooth reduction in speed may be achieved in a state in which an automobile equipped with the power transmission device 10 is traveling.

Meanwhile, referring to FIGS. 1 to 3, the first one-way clutch 310 and the second one-way clutch 320 may be spaced part from each other in the axial direction A in which the rotary shaft 110 extends, and the outer diameter of the first one-way clutch 310 may be equal to the outer diameter of the second one-way clutch 320. In one example, the first one-way clutch 310 and the second one-way clutch 320 may have sufficient similarity to be compatible with each other. In this case, it is not necessary to manufacture two types of one-way clutches to manufacture the power transmission device 10, and thus, it may be advantageous in terms of productivity and manufacturing costs.

Continuing to refer to FIGS. 1 to 3, the power transmission device 10 may further include a speed reducer housing 400 for accommodating the speed reducer 200. Here, the power transmission unit 300 may further include a third one-way clutch 330 which is provided between the carrier 230 and the speed reducer housing 400 and has one side coupled to the carrier 230 and the other side coupled to the speed reducer housing 400. Here, according to the present disclosure, the third one-way clutch 330 may have the same phase as the first one-way clutch 310. Thus, when the first one-way clutch 310 transmits the rotational force of the rotary shaft 110 to the sun gear 210 in a locked state as the rotary shaft 110 rotates in the first direction D1, the third one-way clutch 330 may also be in a locked state, and accordingly, the carrier 230 may be fixed to the speed reducer housing 400. The planetary gears 220 do not revolve around the sun gear 210 when the rotary shaft 110 rotates in the first direction D1 as described above. This may be because the carrier 230 is fixed to the speed reducer housing 400 by the third one-way clutch 330. On the other hand, when the rotary shaft 110 rotates in the second direction D2, the third one-way clutch 330 is in an idle state because the carrier 230 rotates.

Hereinafter, an automobile according to the present disclosure will be described. The contents described above with respect to the power transmission device according to the present disclosure may also be applied, in the same manner, to the automobile according to the present disclosure.

An automobile according to the present disclosure may include a power transmission device 10 and a wheel (not shown) that receives rotational force from the power transmission device 10.

Here, the power transmission device 10 may include a motor 100 including a rotary shaft 110, a speed reducer 200 provided on one side of the motor 100, and a power transmission unit 300 which is provided inside the speed reducer 200 and transmits, to the speed reducer 200, rotational force generated by driving of the motor 100. Also, the power transmission unit 300 may transmit the power such that a ratio of rotational angular velocity of the speed reducer 200 to rotational angular velocity of the rotary shaft 110 is changed according to rotation directions of the rotary shaft 110 of the motor 100.

The speed reducer 200 may include a sun gear 210 coupled to the rotary shaft 110 of the motor 100, a plurality of planetary gears 220 provided on the outer surface of the sun gear 210 to engage with the sun gear 210, a carrier 230 which is coupled to the plurality of planetary gears 220 and rotates in engagement with revolution of the plurality of planetary gears 220 around the sun gear 210, and a ring gear 240 provided on the outside of the plurality of planetary gears 220 in a radial direction R to engage with the planetary gears 220. For example, the carrier 230 accommodates the plurality of planetary gears 220 therein, and the surface of the carrier 230 may have through-holes through which planetary gears 220 are respectively exposed to the outside. Here, in regions where the through-holes are formed, each of the plurality of planetary gears 220 may engage with the ring gear 240.

Also, the automobile may further include a wheel bearing 500 coupled to the outside of the ring gear 240 in the radial direction R. The wheel bearing 500 may include an inner race 510 fixed to the ring gear 240 and an outer race 520 provided on the outside of the inner race 510 in the radial direction R, and the outer race 520 may be fixed to the automobile. Thus, the rotational force of the ring gear 240 may be transmitted to the wheel via the inner race 510.

Various embodiments of the present disclosure do not list all available combinations but are for describing a representative aspect of the present disclosure, and descriptions of various embodiments may be applied independently or may be applied through a combination of two or more.

An aspect of the present disclosure provides a power transmission device that minimizes separate additional components and achieves different speed reduction ratios.

An aspect of the present disclosure may enable compact design of the automobile in which the motor is mounted. In contrast to devices in which additional components such as a synchronizer, an actuator, or a separate motor need to be mounted to change the speed reduction ratio of the speed reducer according to the driving state of the automobile, embodiments of the present invention provide a power transmission device capable of minimizing separate additional components and achieving different speed reduction ratios.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A power transmission device comprising:
a motor comprising a rotary shaft;
a speed reducer provided on one side of the motor; and
a power transmitter, provided inside the speed reducer, configured to transmit rotational force generated by driving of the motor to the speed reducer,
wherein the power transmitter is configured to transmit the power such that a ratio of rotational angular velocity of the speed reducer to rotational angular velocity of the rotary shaft is changed according to rotation directions of the rotary shaft of the motor,
wherein the speed reducer comprises:
a sun gear provided on the outside of the rotary shaft of the motor in a radial direction (R);
a plurality of planetary gears provided on the outside of the sun gear in the radial direction (R) configured to engage with the sun gear; and
a carrier coupled to the plurality of planetary gears and configured to rotate in engagement with revolution of the plurality of planetary gears around the sun gear, and
wherein the power transmission unit further comprises:
a first one-way clutch provided between the rotary shaft of the motor and the sun gear, and
a second one-way clutch provided between the rotary shaft of the motor and the carrier.

2. The power transmission device of claim 1, wherein the first one-way clutch and the second one-way clutch have phases opposite to each other.

3. The power transmission device of claim 1, wherein when the rotary shaft of the motor rotates in a first direction (D1),
the first one-way clutch is configured to transmit power to the sun gear, wherein the power is generated by rotation of the rotary shaft of the motor.

4. The power transmission device of claim 3, wherein when the rotary shaft of the motor rotates in the first direction (D1), the second one-way clutch is configured to interrupt the power transmission between the motor and the carrier.

5. The power transmission device of claim 1, wherein when the rotary shaft of the motor rotates in a second direction (D2) opposite to the first direction (D1), the second one-way clutch is configured to transmit power to the carrier, wherein the power is generated by rotation of the rotary shaft of the motor.

6. The power transmission device of claim 1, wherein the first one-way clutch and the second one-way clutch are spaced apart from each other in an axial direction (A) in which the rotary shaft extends.

7. The power transmission device of claim 1, wherein an outer diameter of the first one-way clutch is equal to an outer diameter of the second one-way clutch.

8. The power transmission device of claim 1, wherein the speed reducer further comprises a ring gear provided on the outside of the plurality of planetary gears in the radial direction (R) to engage with the plurality of planetary gears.

9. The power transmission device of claim 1, further comprising a speed reducer housing configured to accommodate the speed reducer,
wherein the power transmitter further comprises a third one-way clutch provided between the carrier and the speed reducer housing.

10. The power transmission device of claim 9, wherein the third one-way clutch has the same phase as the first one-way clutch.

11. An automobile comprising:
a power transmission device; and
a wheel configured to receive rotational force from the power transmission device,
wherein the power transmission device comprises:
a motor comprising a rotary shaft;
a speed reducer provided on one side of the motor; and
a power transmitter, provided inside the speed reducer, configured to transmit rotational force generated by driving of the motor to the speed reducer,
wherein the power transmitter is configured to transmit the power such that a ratio of rotational angular velocity of the speed reducer to rotational angular velocity of the rotary shaft is changed according to rotation directions of the rotary shaft of the motor,
wherein the speed reducer comprises:
a sun gear provided on the outside of the rotary shaft of the motor in a radial direction (R);
a plurality of planetary gears provided on the outside of the sun gear in the radial direction (R) to engage with the sun gear; and
a ring gear provided on the outside of the plurality of planetary gears in the radial direction (R) to engage with the plurality of planetary gears, and
wherein the automobile further comprises a wheel bearing coupled to the outside of the ring gear in the radial direction (R).

12. The automobile of claim 11, wherein the speed reducer comprises:
a carrier which is coupled to the plurality of planetary gears and configured to rotate in engagement with revolution of the plurality of planetary gears around the sun gear.

13. The automobile of claim 12,
wherein the wheel bearing comprises:
an inner race fixed to the ring gear; and
an outer race provided on the outside of the inner race in the radial direction (R).

* * * * *